United States Patent [19]
Ho

[11] Patent Number: 5,599,080
[45] Date of Patent: Feb. 4, 1997

[54] SLIDING CASE MOUNTING DEVICE

[76] Inventor: Hsin C. Ho, 20F-1, 268, Sec.1, Wen Hua Road, Pan Chiao City, Taipei, Taiwan

[21] Appl. No.: 600,098

[22] Filed: Feb. 8, 1996

[51] Int. Cl.⁶ .................................................. A47B 88/00
[52] U.S. Cl. .................................. 312/334.7; 312/334.14; 361/685
[58] Field of Search ........................... 312/334.14, 223.2, 312/334.1, 334.7, 333; 361/685, 725, 727

[56]  References Cited

U.S. PATENT DOCUMENTS

| | | | |
|---|---|---|---|
| 4,453,790 | 6/1984 | Cohen et al. | 312/334.7 |
| 4,979,909 | 12/1990 | Andrews | 312/333 X |
| 5,227,954 | 7/1993 | Twigg | 312/334.7 X |
| 5,262,923 | 11/1993 | Batta et al. | 312/334.7 X |
| 5,332,306 | 7/1994 | Babb et al. | 361/685 X |
| 5,463,527 | 10/1995 | Hager et al. | 361/685 |
| 5,510,955 | 4/1996 | Taesang | 361/685 |

FOREIGN PATENT DOCUMENTS 4064112   2/1992   Japan ..................... 361/685

OTHER PUBLICATIONS

I.B.M. Technical Disclosure Bulletin "Direct Access Storage Device Commodity Stacking Plates", vol. 30, No. 1, Jun. 1987.

*Primary Examiner*—Peter M. Cuomo
*Assistant Examiner*—James O. Hansen
*Attorney, Agent, or Firm*—Pro-Techtor International

[57]  ABSTRACT

A sliding case mounting device including two sliding case mounting rails fixed to two opposite long sides of a rectangular sliding case, permitting it to be installed in two rows of circular track elements inside a mainframe, each sliding case mounting rail having two horizontal projecting plug rods perpendicularly disposed at two opposite ends at an outer side and respectively plugged into respective mounting holes in the sliding case, two inward bends symmetrically disposed at an inner side in a parallel relation, which provide a respective smoothly curved edge that does not hurt when touched, a mouth at one end, which guides one row of circular track elements into engagement with the respective rail, two outward hooks perpendicularly disposed at two opposite ends at an outer side and hooked in respective mounting holes at the bottom side of the sliding case, a front extension strip, an inward hook raised from the front extension strip at an inner side and hooked in a respective retaining hole inside the mainframe, and a press portion at one end of the front extension strip for pressing by hand to release the inward hook from the respective retaining hole of the mainframe for permitting the sliding case to be disconnected from the mainframe.

1 Claim, 5 Drawing Sheets

5,599,080

SLIDING CASE MOUNTING DEVICE

BACKGROUND OF THE INVENTION

The present invention relates to a sliding case mounting device which comprises two maintain rails fixed to two opposite lateral sides of a sliding case for quick loading/unloading of the sliding case.

Regular diskdrives and CD-ROMs are now commonly made slidable so that they can be conveniently detachably installed in the mainframe of a personal computer. When a sliding diskdrive or CD-ROM is inserted into parallel tracks inside the mainframe, it is then fixed in place by screws. When to unload the sliding diskdrive or CD-ROM, the screws must be removed. Therefore, this installation procedure is somewhat complicated.

SUMMARY OF THE INVENTION

The present invention has been accomplished to provide a sliding case mounting device which permits the sliding case (diskdrive, CD-ROM, etc.) to be conveniently installed in the mainframe, or quickly dismounted from it. According to the preferred embodiment of the present invention, the sliding case comprises two sliding case mounting rails fixed to two opposite long sides of a rectangular sliding case, permitting it to be installed in two rows of circular track elements inside a mainframe. Each sliding case mounting rail has two horizontal projecting plug rods perpendicularly disposed at two opposite ends at an outer side and respectively plugged into respective mounting holes in the sliding case, two inward bends symmetrically disposed at an inner side in a parallel relation, which provide a respective smoothly curved edge that does not hurt when touched, a mouth at one end, which guides one row of circular track elements into engagement with the respective rail, two outward hooks perpendicularly disposed at two opposite ends at an outer side and hooked in respective mounting holes at the bottom side of the sliding case, a front extension strip, an inward hook raised from the front extension strip at an inner side and hooked in a respective retaining hole inside the mainframe, and a press portion at one end of the front extension strip for pressing by hand to release the inward hook from the respective retaining hole of the mainframe for permitting the sliding case to be disconnected from the mainframe.

DETAILED DESCRIPTION OF THE PREFERRED EMBODIMENT

Figure 1:
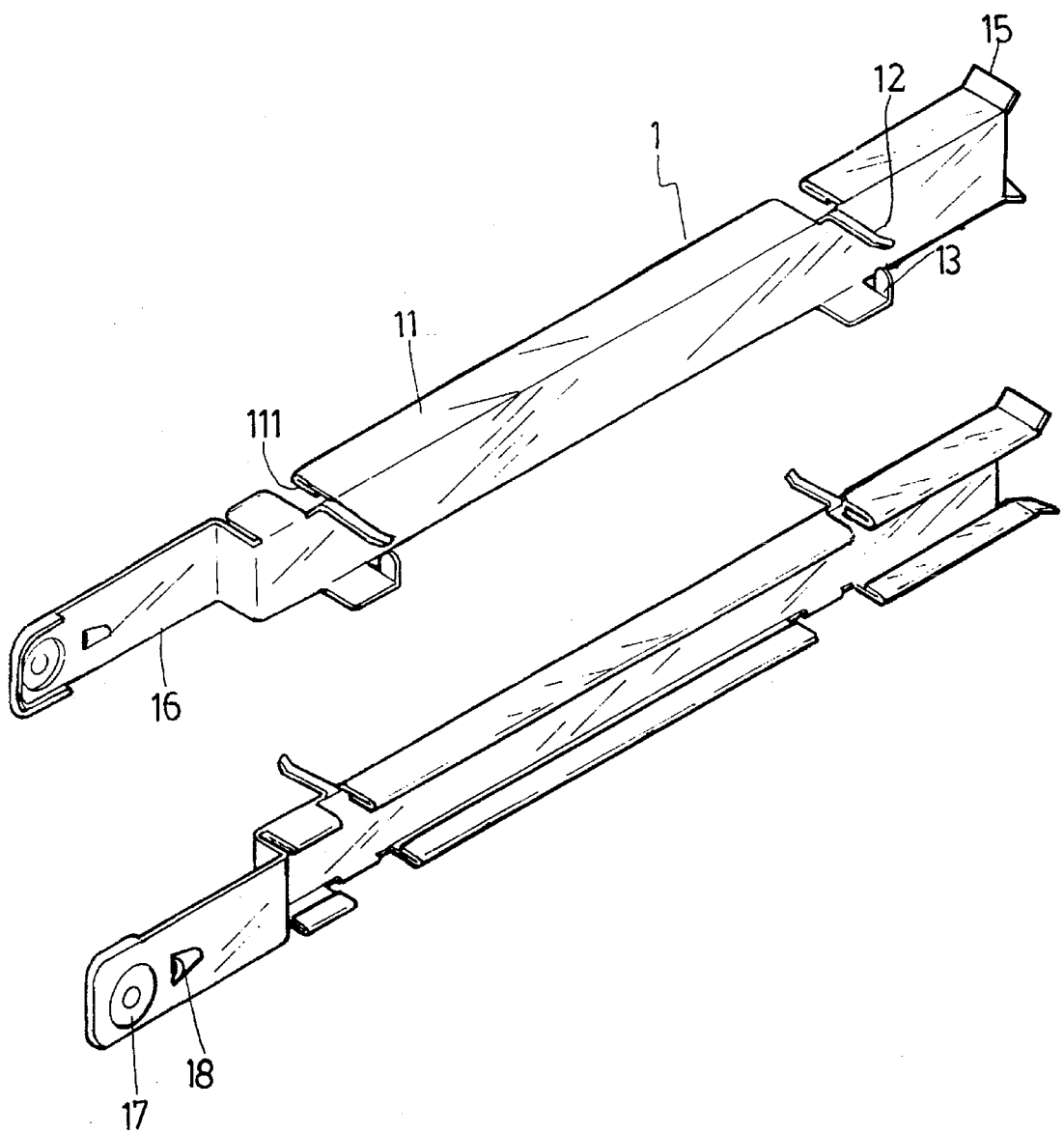
FIG. 1 shows a sliding case mounting device according to the present invention.
Figure 2:
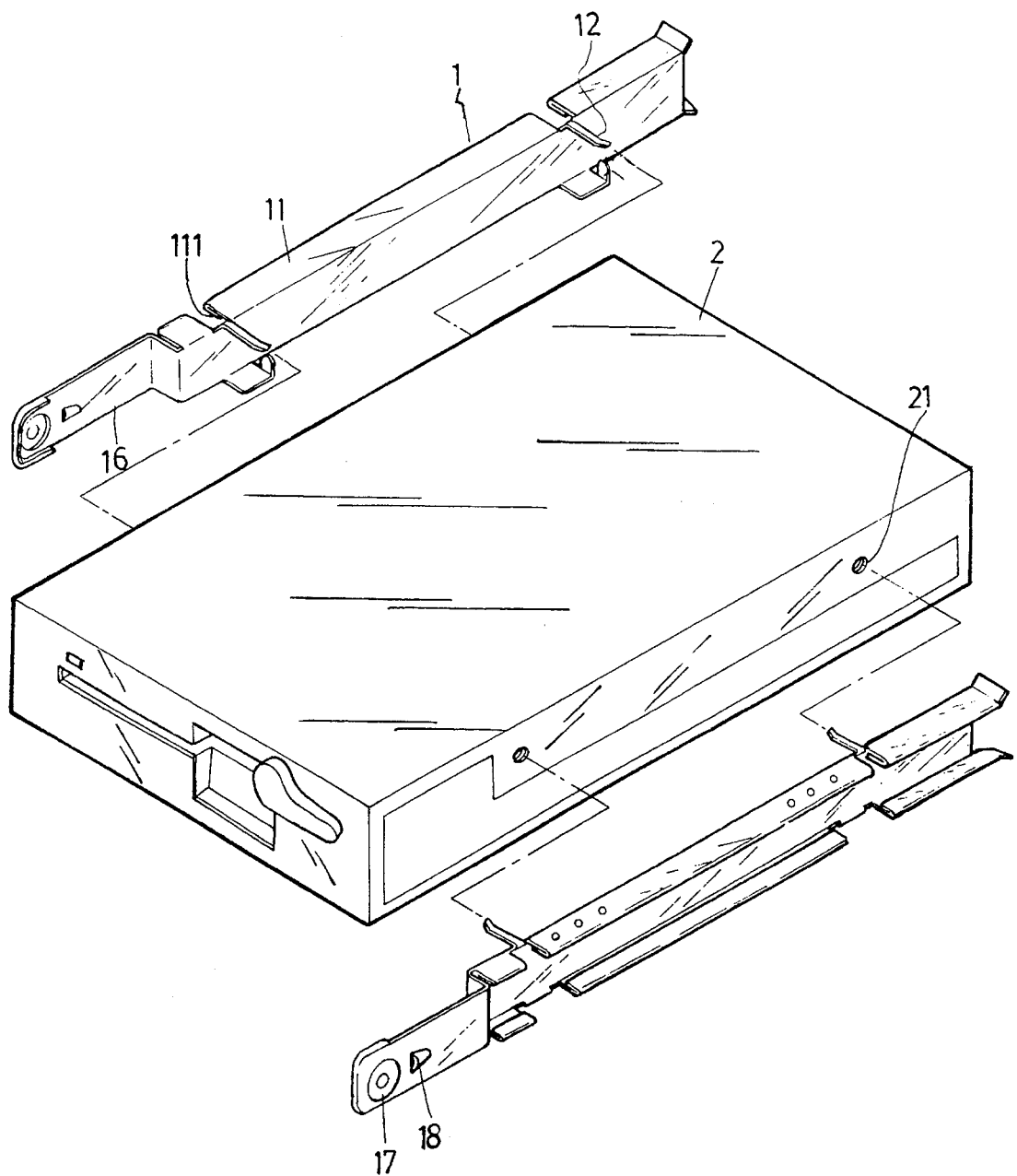
FIG. 2 hows the position of the sliding case mounting device relative to the sliding case according to the present invention.
Figure 3:
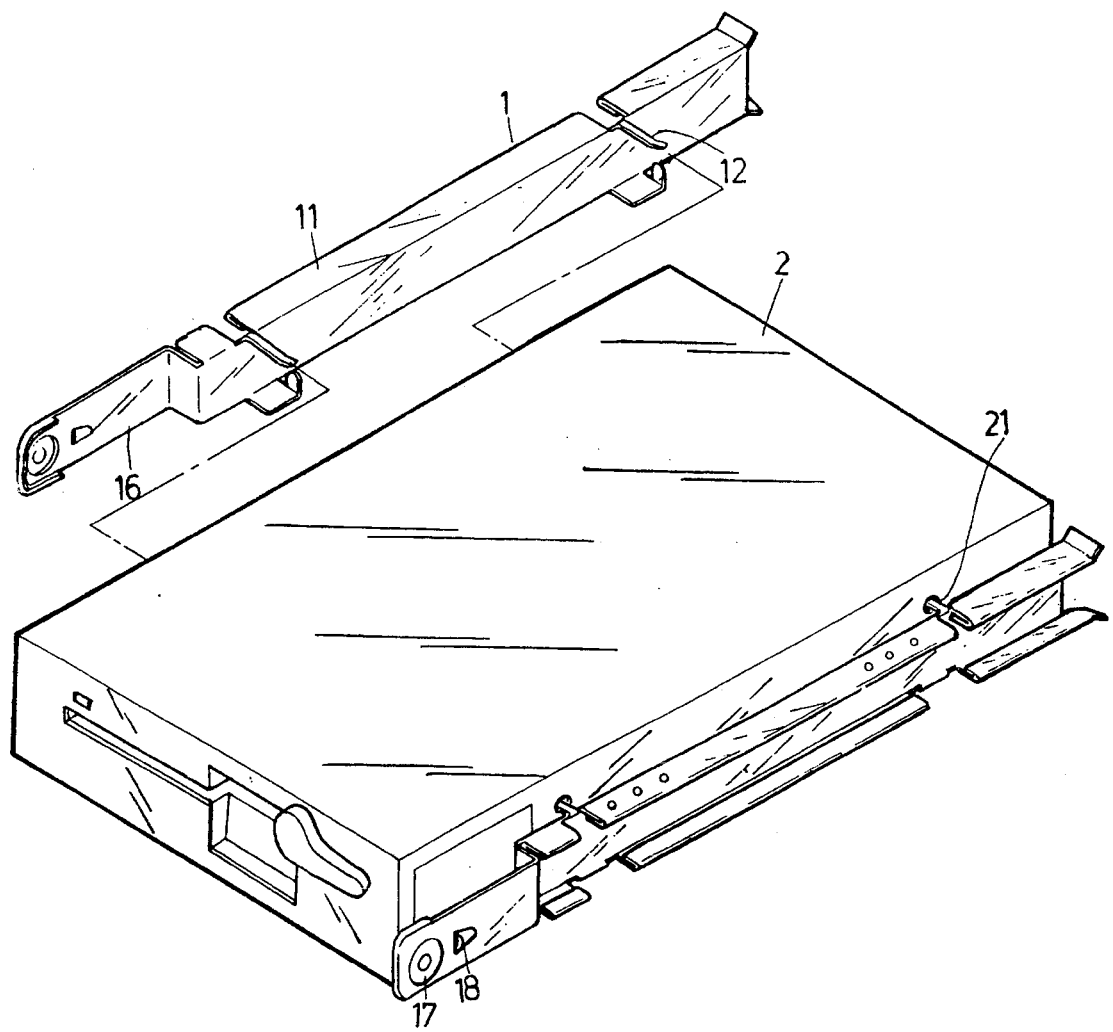
FIG. 3 shows one sliding case mounting rail of the sliding case mounting device fixed to one lateral side of the sliding case according to the present invention.
Figure 4:
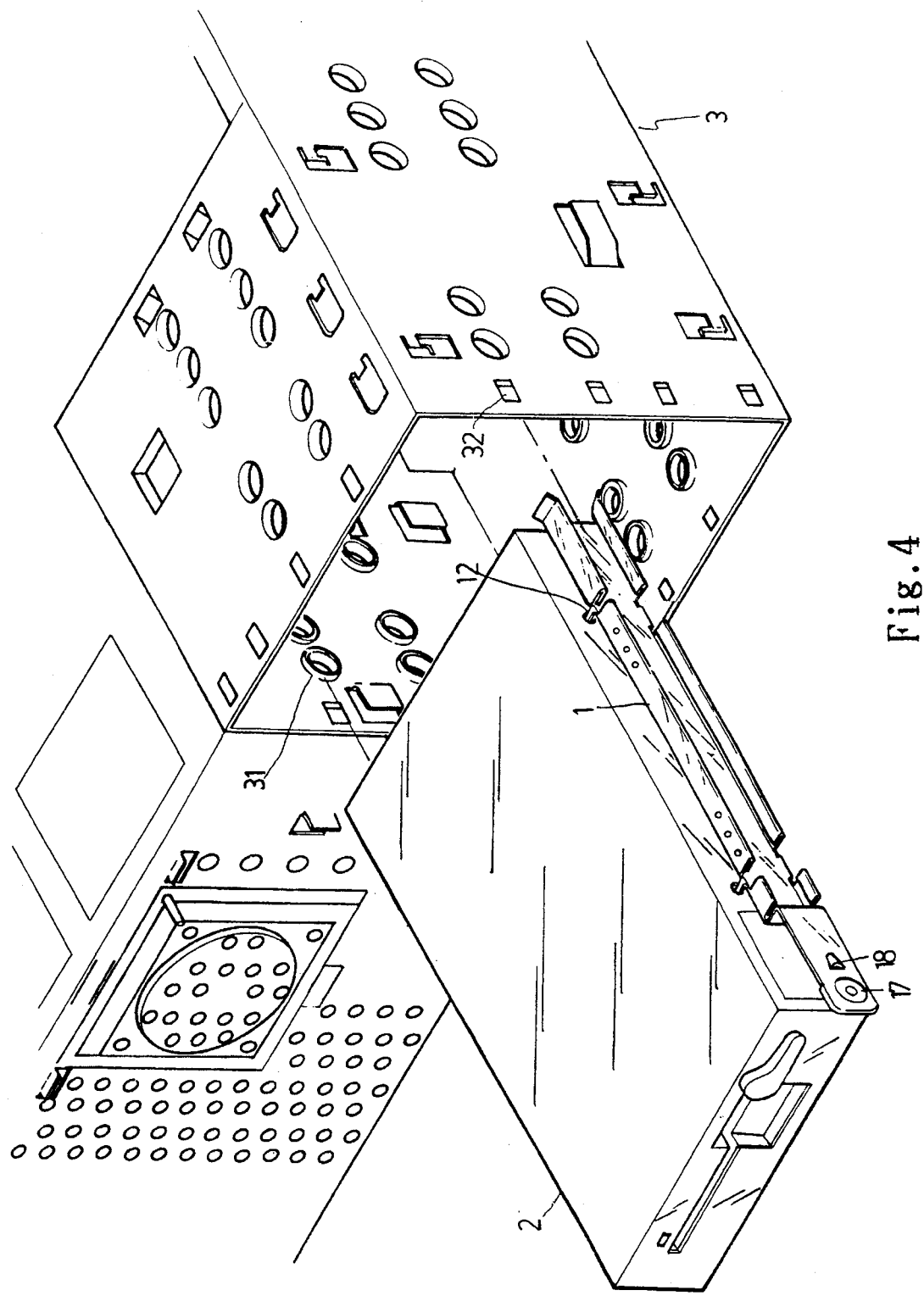
FIG. 4 shows the position of the sliding case mounting device with the sliding case relative to the mainframe according to the present invention.

Referring to FIGS. 1, 2, 3, and 4, the sliding case mounting device of the present invention comprises two sliding case mounting rails fixed to two opposite long sides of a rectangular sliding case 2 (for example, a diskdrive or CD-ROM), permitting the rectangular sliding case 2 to be conveniently installed in a mainframe 3. Each of the sliding case mounting rails 1 comprises a channel-like rail body 11, two inward bends 111 symmetrically disposed at an inner side in a parallel relation, which provide a respective smoothly curved edge that does not hurt when touched, two horizontal projecting plug rods 12 perpendicularly raised from two opposite ends of the channel-like rail body 11 at an outer side, a mouth 15 at one side, two outward hooks 13 respectively raised from two opposite ends of the channel-like rail body 11 at the outer side and respectively spaced below the projecting plug rods 12, a front extension strip 16 extending from one end of the channel-like rail body 11 remote from the mouth 15, a press portion 17 at one end of the front extension strip 16 remote from the channel-like rail body 11, and an inward hook 18 raised from the front extension strip 16 at an inner side.

Figure 5:
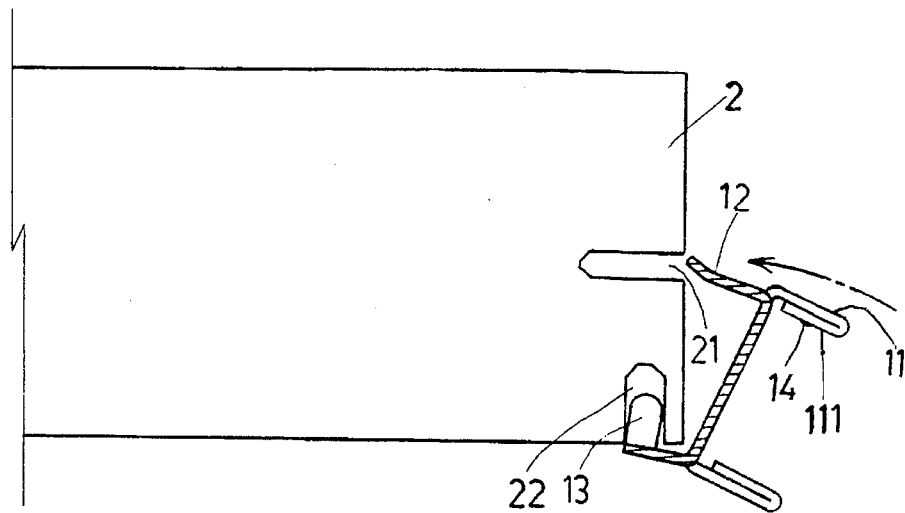
FIG. 5 is a sectional view showing the installation of one sliding case mounting rail according to the present invention.
Figure 6:
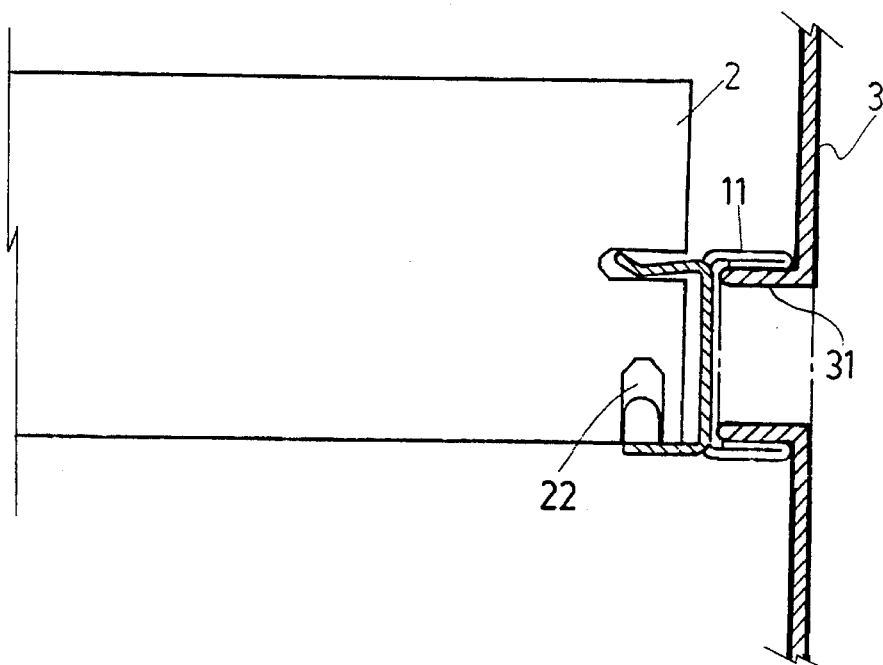
FIG. 6 is a sectional view showing the sliding case mounting rail fixed to the sliding case and installed in the track inside the mainframe according to the present invention.

Referring to FIGS. 5 and 6, and FIG. 4 again, the sliding case mounting rails 1 are respectively fastened to two opposite lateral sides of the sliding case 2 by: hooking the outward hooks 13 in a respective bottom mounting hole 22 on the bottom side of the sliding case 2 (see FIG. 5), and then forcing the projecting plug rods 12 into a respective side mounting hole 21 on one lateral side of the sliding case 2 (see FIG. 6). When the two sliding case mounting rails 1 are fastened to the sliding case 2, the sliding case 2 is inserted into the mainframe 3, permitting two tracks 31 (which are comprised of a respective row of circular track elements raised from the inside wall of the mainframe 3) of the mainframe 3 to be guided through the mouth 15 of each rail 1 into engagement with the channel-like rail body 11 of each rail 1 between the inward bends 111 of each rail 1. When the rails 1 are respectively forced into position, the inward hook 18 of the extension strip 16 of each rail 1 is forced into engagement with a respective retaining hole 32 at one side of the mainframe 3. When the press portions 17 of the sliding case mounting rails 1 are respectively depressed inwards, the inward hooks 18 are respectively released from the respective retaining holes 32, and therefore the sliding case 2 can be removed from the mainframe 3.

It is to be understood that the drawings are designed for purposes of illustration only, and are not intended as a definition of the limits and scope of the invention disclosed.

I claim:

1. A sliding case mounting device comprising two sliding case mounting rails fixed to two opposite long sides of a rectangular sliding case permitting it to be installed in two tracks inside a mainframe, wherein each sliding case mounting rail comprises a channel-like rail body inserted into said mainframe and forced into engagement with one track of said mainframe, two inward bends symmetrically disposed at an inner side in a parallel relation, which provide a respective smoothly curved edge two horizontal projecting plug rods perpendicularly raised from two opposite ends of said channel-like rail body at an outer side and respectively plugged into respective mounting holes in one lateral side of said sliding case, a mouth at one end, which guides one track into engagement with said channel-like rail body, two outward hooks respectively raised from two opposite ends of said channel-like rail body at an outer side below said projecting plug rods and respectively hooked in respective bottom mounting holes in said sliding case, a front extension strip extending from one end of said channel-like rail body remote from said mouth, a press portion at one end of said front extension strip remote from said channel-like rail body, and an inward hook raised from said front extension strip at an inner side and hooked in a respective retaining hole in said mainframe said inward hook being released from the respective retaining hole for permitting said sliding case to be removed from said mainframe when said press portion is depressed inwards.

* * * * *